(12) United States Patent
Oliver

(10) Patent No.: US 6,189,528 B1
(45) Date of Patent: Feb. 20, 2001

(54) OUTDOOR COOKING SYSTEM

(76) Inventor: Randall William Oliver, 9911 Whitehurst #411, Dallas, TX (US) 75243

(*) Notice: Under 35 U.S.C. 154(b), the term of this patent shall be extended for 0 days.

(21) Appl. No.: 09/318,118

(22) Filed: May 25, 1999

(51) Int. Cl.[7] .................................................. A47J 33/00
(52) U.S. Cl. ..................... 126/25 R; 126/9 B; 126/39 R
(58) Field of Search .................................. 126/9 R, 9 B, 126/25 R, 39 R

(56) References Cited

U.S. PATENT DOCUMENTS

| | | | |
|---|---|---|---|
| 1,321,678 | * | 11/1919 | Skinner ................................ 126/9 R |
| 2,666,426 | * | 1/1954 | Pollard ................................ 126/25 R |
| 4,090,490 | * | 5/1978 | Riley et al. ........................ 126/25 R |
| 4,418,678 | * | 12/1983 | Erickson ............................ 126/9 R |
| 4,665,891 | * | 5/1987 | Nemec et al. ..................... 126/25 R |
| 5,140,896 | * | 8/1992 | Duran ................................. 126/25 R |
| 5,678,531 | * | 10/1997 | Byers et al. ....................... 126/25 R |
| 5,947,013 | * | 9/1999 | Stewart, Jr. ....................... 126/25 R |

* cited by examiner

*Primary Examiner*—Ira S. Lazarus
*Assistant Examiner*—Sara Clarke

(57) ABSTRACT

A portable grill easily carried as components, which may be stacked as generally flat parts, to be carried in a compact container, and may be easily assembled without tools and used in various modes. Upper and lower reflectors which are flat rectangular parts when disassembled, are flexed and held in arcuate shapes upon assembly, to form the cooker lid and body, respectively, by rods that engage the edges of the reflectors and mount in holes in the legs. After use, the cooker may be disassembled and transported again. By installing, removing and substituting various parts, the cooking unit may be used as, for example, a grill, a baker, a boiler, a smoker, a steamer, a deep fryer and the like. Provision is made for propane as well as charcoal, wood and other consumable fuels.

66 Claims, 11 Drawing Sheets

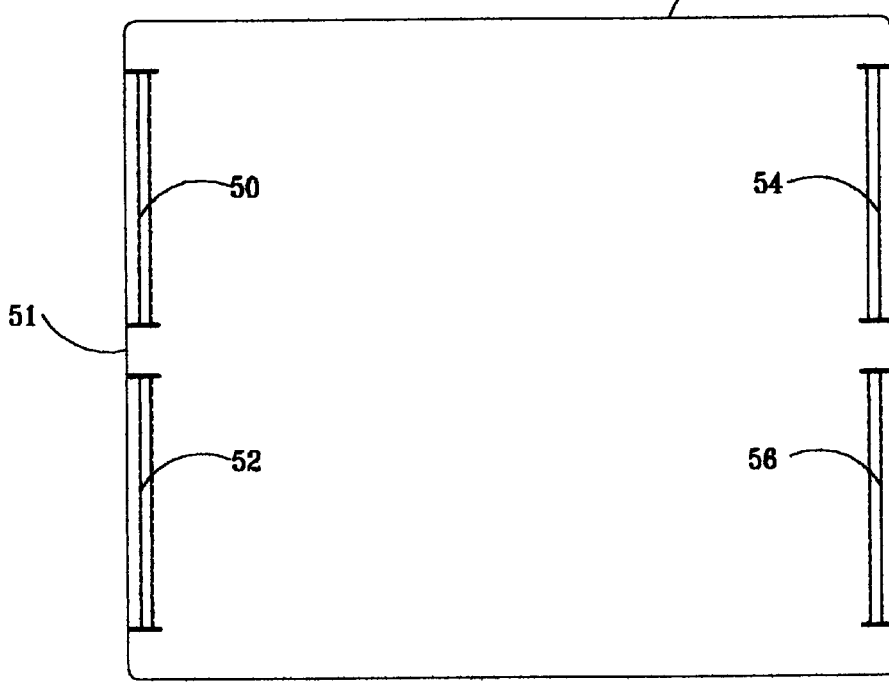
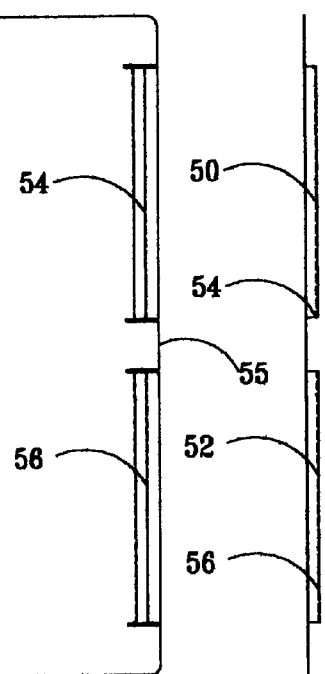
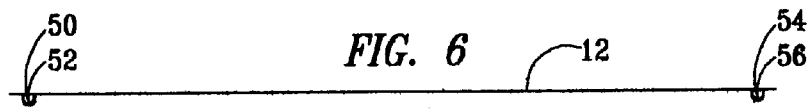
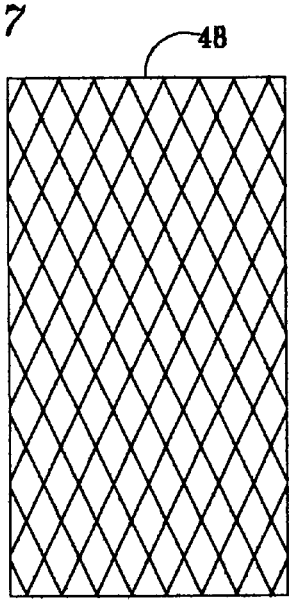
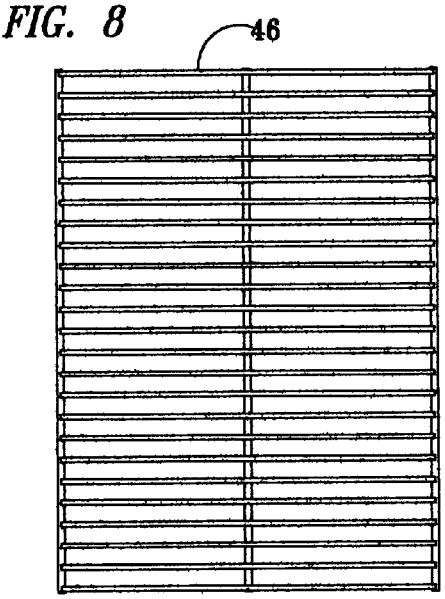

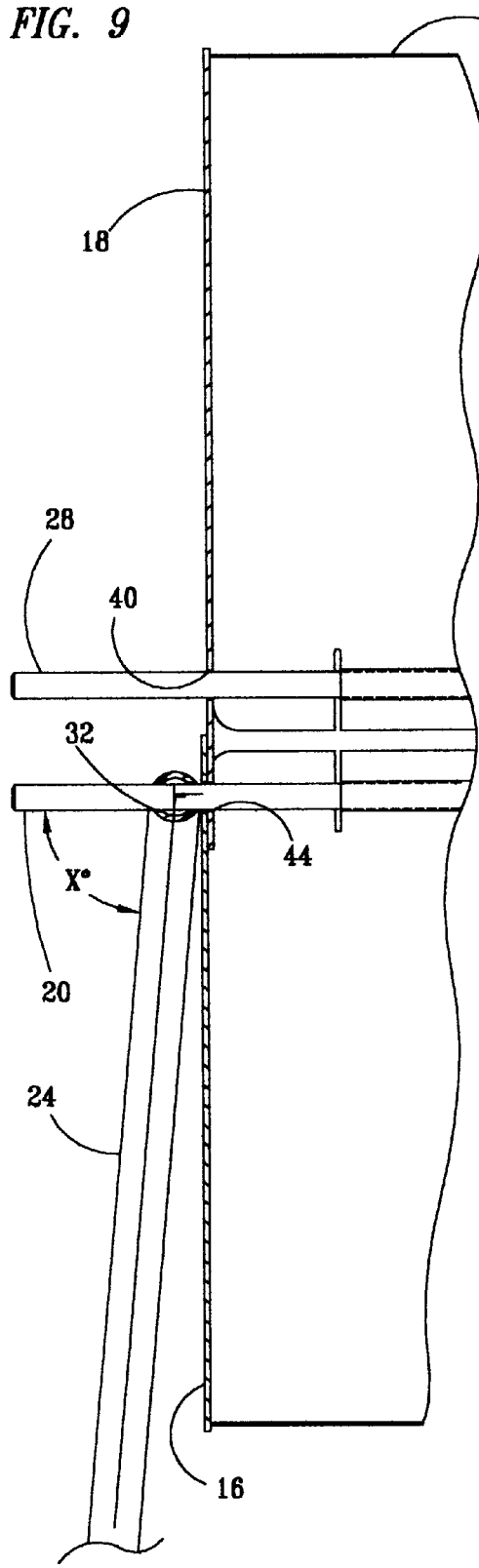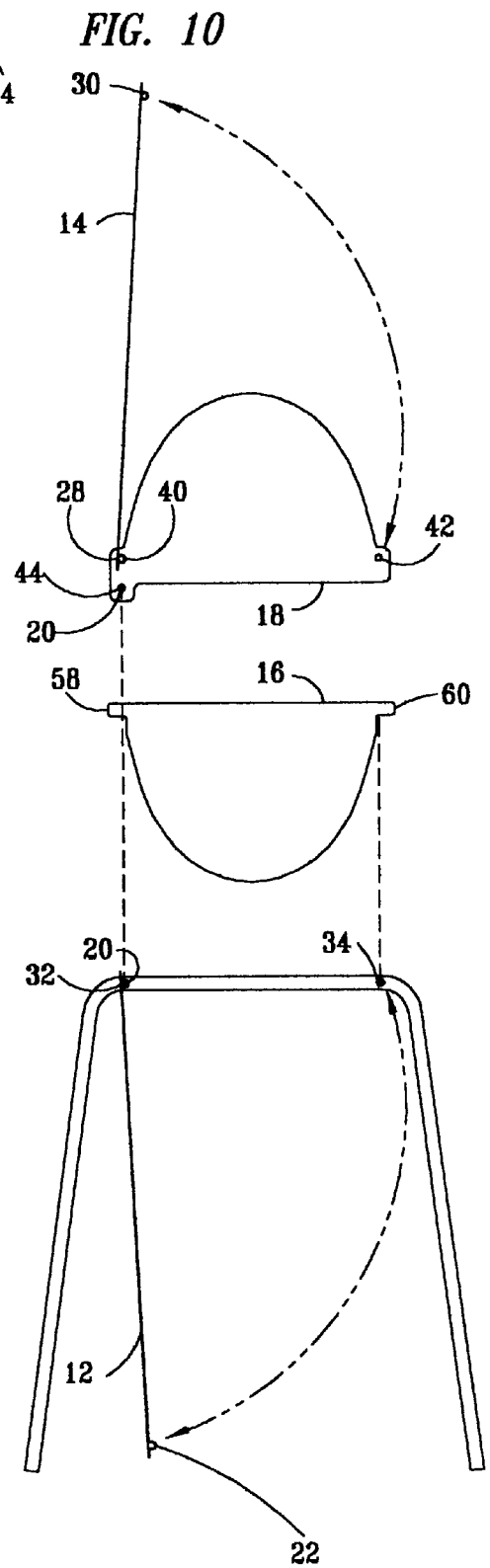

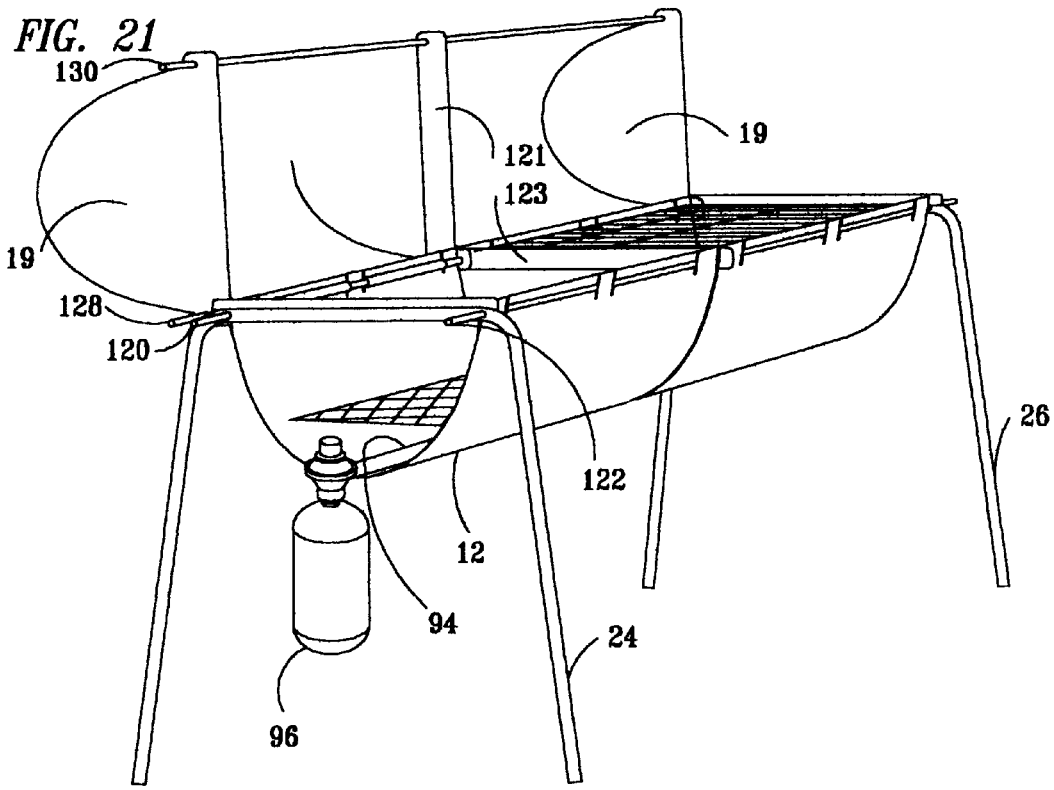
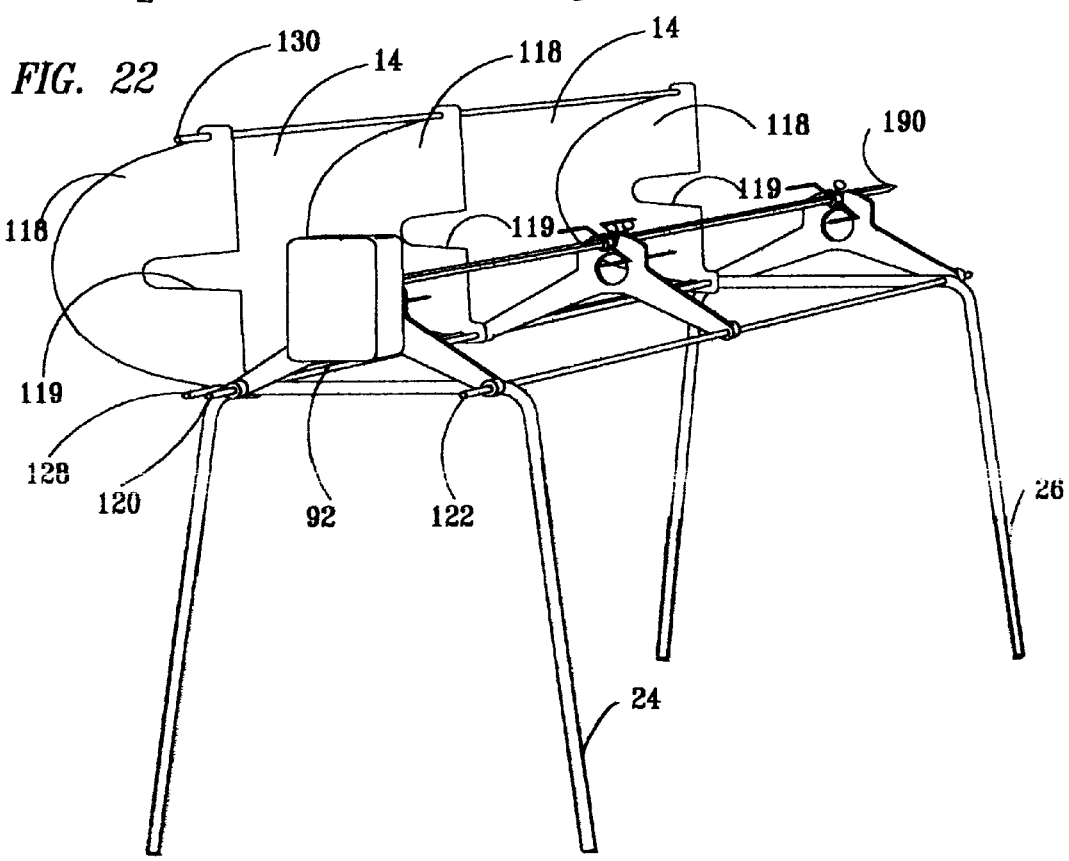

OUTDOOR COOKING SYSTEM

FIELD OF THE INVENTION

The invention relates generally to a cooking system and, more particularly, to a versatile outdoor cooking system which permits rapid assembly and disassembly for easy storage and transportation

BACKGROUND OF THE INVENTION

Cooking outdoors is well-known and many system's have been developed to facilitate cooking outdoors. However, the systems that are available either are limited in desirable features or, if they are provided with many desirable features, are heavy and cumbersome to store and difficult to transport, for example, by one hiking through a wilderness area.

Therefore, what is needed is a lightweight outdoor cooking system which provides desirable features and which may also be easily stored and readily transported.

Many available systems are inefficient by design. Deficiencies include:

Inadequate draft control.

No fire grate.

No Combustion air control.

Open lid designs lose heat, do not reflect heat to food being cooked.

No radiant heat.

Not rain proof or wind proof.

Square shapes are less efficient than parabolic or semi circular shapes.

Painted surfaces absorb heat while unpainted aluminum reflects heat.

Grills with short legs may start grass fires.

Grills with short legs are inconvenient, requiring the user to stoop or squat.

No place to hang implements.

SUMMARY OF THE INVENTION

The present invention, accordingly, provides a system for cooking outdoors which permits rapid assembly and disassembly with the feature that when disassembled all the pieces lie flat for easy storage and transportation. Additionally, the system includes a number of additional features which enable it to be used in a number of different cooking modes as, for example, a grill, a baker, a boiler, a smoker, a steamer, a deep fat fryer, and the like. Some of these modes may be carried out simultaneously. A dutch oven may be utilized in the present invention, without a ground fire, and can be used despite rain or wind. Improved draft control makes possible starting of charcoal fire, even in rain, by positioning body and lid ends to control draft.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is a plan view of a reflector used in the cooking system of FIG. 1;

FIG. 5 is a side view of a reflector used in the cooking system of FIG. 1 taken along the line 5—5 of FIG. 4;

FIG. 6 is a side view of a reflector used in the cooking system of FIG. 1 taken along the line 6—6 of FIG. 4;

FIG. 7 is a fire grate configured for use with the cooking system of FIG. 1;

FIG. 8 is a cooking grate configured for use with the cooking system of FIG. 1;

FIG. 9 is a cross-sectional partially broken-away view of a portion of one and of the cooking system of FIG. 1 taken along the line 9—9 of FIG. 1, and showing the engagement of a leg-pair with two rods, two reflectors, and two wind-screens;

FIG. 10 is an exploded side view of the cooking system of FIG. 1 taken along the line 10—10 of FIG. 1 and showing how two reflectors flex in the assembly and disassembly of the cooking system of FIG. 1;

FIG. 21 is a perspective view of the cooking system of FIG. 19 configured with a fire grate on one side and a cooking grate on the other side;

FIG. 22 is a perspective view of the cooking system of FIG. 19 configured with a rotisserie and spit mounted thereon.

DESCRIPTION OF THE PREFERRED EMBODIMENT

Figure 1:
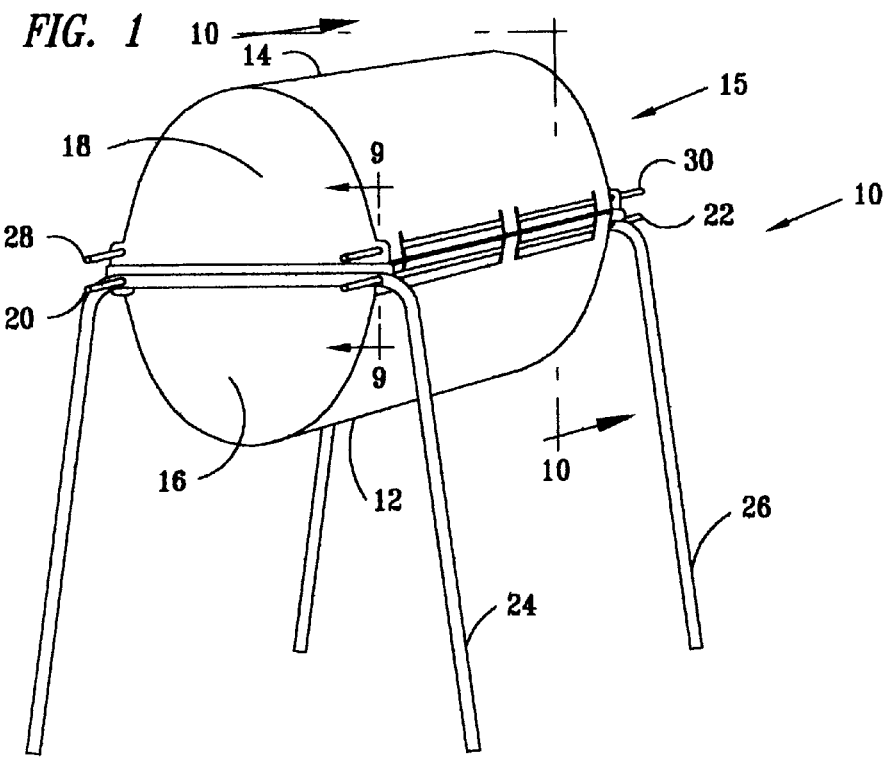
FIG. 1 is a perspective view of an outdoor cooking system embodying features of the present invention.

Referring to FIG. 1, the outdoor cooking system embodying features of the present invention is generally illustrated at 10. A body reflector 12 forms a portion of the body of the cooker, and another reflector 14 forms a portion of the lid assembly 15. A body end 16 at each end of reflector 12 closes the ends of the body portion of the cooker. Body end 16 lifts up to access fire or baking area below grill. Lid ends 18 and 19 (see FIG. 2) at each end of reflector 14 close the ends of lid 15 of the cooker. Rods 20 and 22 join and support reflector 12, as will be described hereinafter. Rods 28 and 30 join with and support reflector 14, as will be described hereinafter. Rod 20 also acts as a hinge pin about which lid 15 pivots for access to any heat source or food in the cooker.

Figure 2:
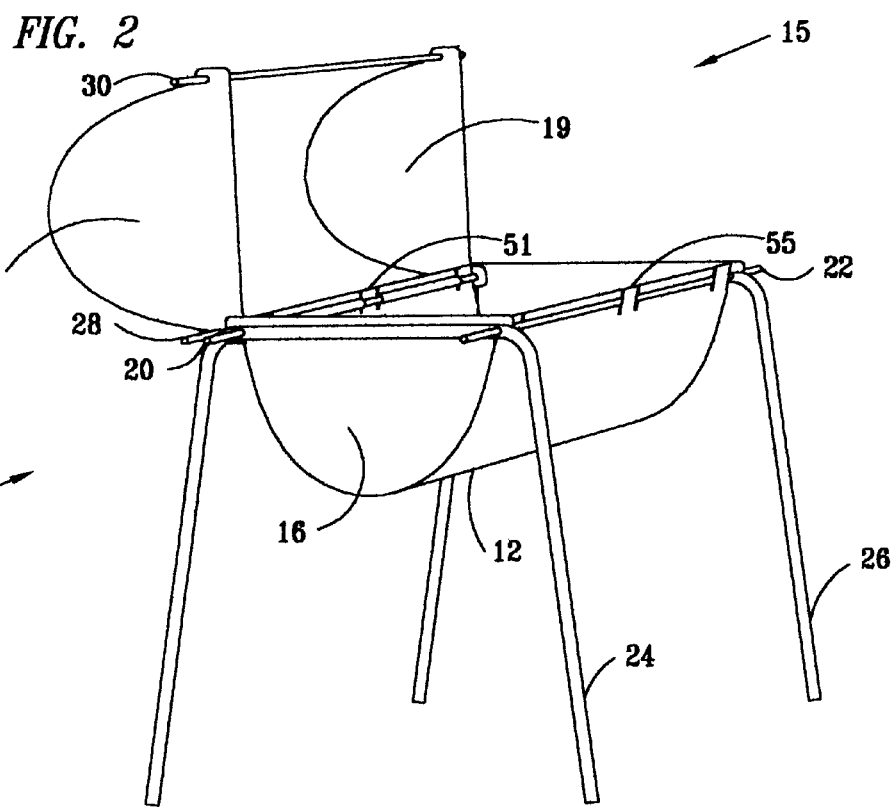
FIG. 2 is a perspective view of the cooking system of FIG. 1 in which a top reflector is open.

Referring to FIG. 2, the cooker 10 is shown with the lid 15 open, showing lid end 19, without the cooking grill.

Figure 3:
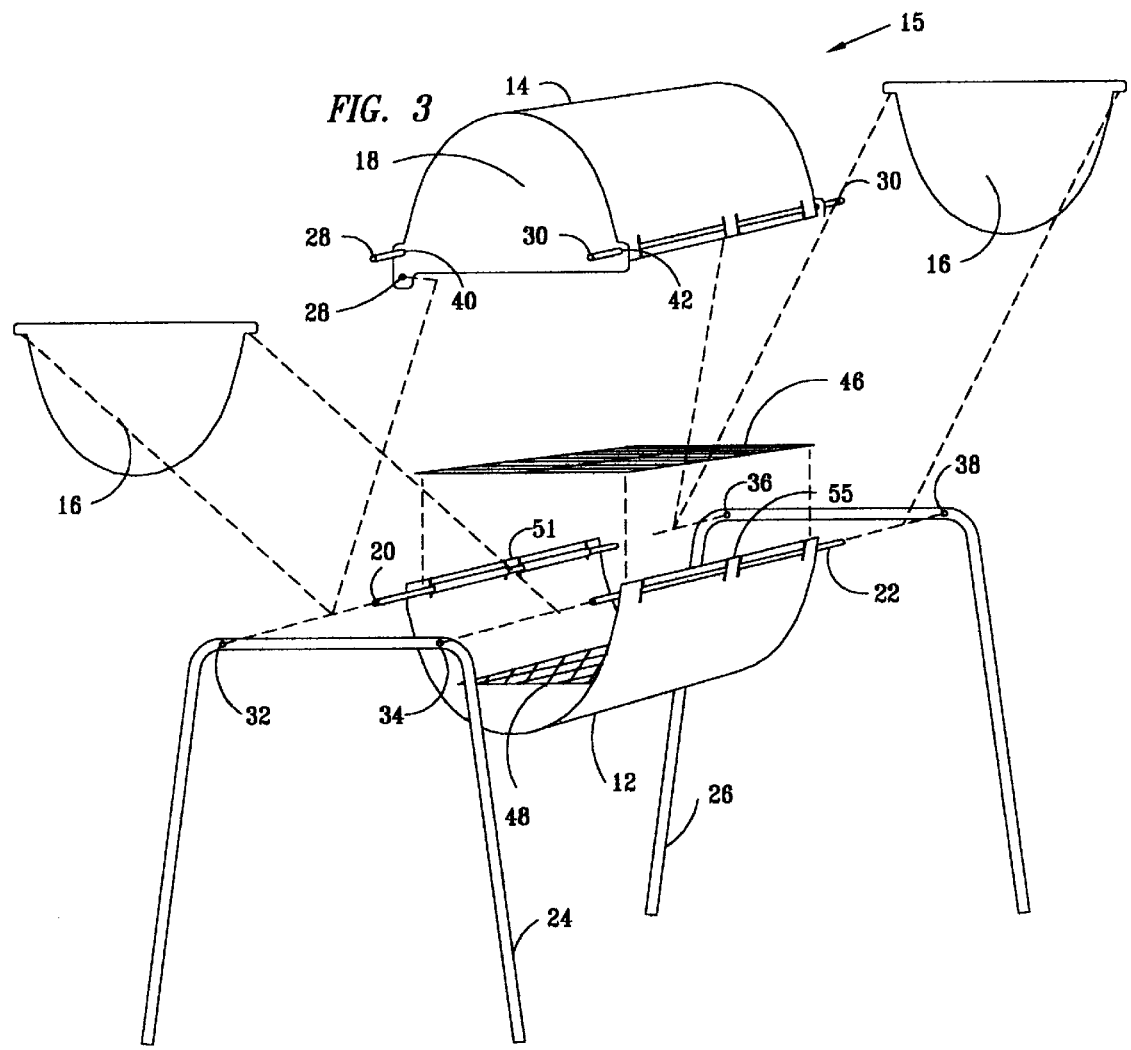
FIG. 3 is an exploded view of the outdoor cooking system of FIG. 1.

FIG. 3 shows an exploded parts relationship between some of the parts of cooker 10. Rods 20 and 22 insert through conduits formed in the edges of reflector 12 and into hole 44 in lid end 18 and a similar hole in lid end 19, not shown in FIG. 3, and into holes 32 and 34, respectively, in leg stand 24; and into holes 36 and 38, respectively, in leg 26. Rods 28 and 30 insert through conduits formed in the edges of reflector 14 and into holes 40 and 42 in lid end 18 and similar holes in lid end 19. In the preferred embodiment, lid ends 18 and 19 are identical. Grill 46 is positioned atop rods 20 and 22. Grate 48 is positioned inside reflector 12 to support charcoal or other flammable material burned to supply heat for cooking. Grate 48 has a front edge and a back edge, the edges engaging and supported by the body reflector. Grate 48 is usually placed in a generally horizontal position as shown, but may be placed in an angular position in order to place the flame closer to the grill to attain greater heat for cooking. Grate 48 is supported for supporting flammable fuel in the cooker, the grate having a width less than the width of the grill, the grate having a first edge and a second opposite edge, the edges located inside of and engaging the interior of the body reflector to support the grate beneath the grill. The grate may be placed in a horizontal position by the grate edges engaging the body reflector, or may be tilted with the first edge higher than the second edge to place some of the fire closer to the food to speed up the cooking process.

In the preferred embodiment leg stands 24 and 26 are identical. The projecting ends of rod 30 provide handles for lifting the lid to access the food in cooker 10. The projecting ends of rods 20 and 22 provide convenient places to hang tongs, forks or other cooking accessories. The flexibility of the body reflector and body rods allow the leg stands 24 and 26 to adjust to irregular terrain. In the preferred embodiment, the body reflector 12 is sufficiently flexible to allow the grill 10 to twist enough to allow the leg ends to move so that one leg end may move to at least 2 inches from a plane defined by the other three leg ends.

FIGS. 4, 5 and 6 show plan, side and front views of reflector 12. In the preferred embodiment, reflectors 12 and 14 are identical. Conduits 50 and 52 are formed in alignment on one edge of reflector 12 to accept one of rods 20, 22, 28 or 30. Conduits 50 and 52 each define a central axis central and longitudinal to the lengths therethrough. Conduits 54 and 56 are formed in the opposite edge of reflector to accept any of the rods, 20, 22, 28 or 30. Tabs 51 and 55 are positioned alternate to conduits 50 and 52, and 54 and 56. A portion of reflector 12 preferably extends beyond conduits 50, 52, 54 and 56, coplanar with the main portion of reflector 12 and with tabs 51 and 55. Referring to FIGS. 2 and 3, tabs 51 and 55 extend above rods 20 and 22 to guide and contain grill 46 and prevent grill 46 from becoming displaced from the desired position, as for example, if meat should stick to grill 46 during cooking, a fork or spatula may be pushed between the meat and grill 46 to free the meat for turning or removal from the grill.

FIG. 7 shows the fire grate 48 which may be placed in the assembled cooker to support the fire spaced away for the reflector 12 to provide heat insulation from reflector 12 and provide air draft to support combustion of the fire. The grate 48 is of a selected length to fit within the length of reflector 12 and sized in width to fit within the reflector 14 and below rods 20 and 22. Preferably, the width of the grate 48 positions the grate of a suitable distance below rods 20 and 22, which in the preferred embodiment, the width is substantially 70% of the center distance between the holes in leg stands 24 and 26. Depending on the proportions of reflector 12 and leg stands 24 and 26, the width of the grate 48 may vary between 65% and 75% of this center distance, and possibly between 60% and 80% of this center distance. The fire grate illustrated is made of "expanded metal" sheet which has multiple slits in an alternating pattern, which are stretched to provide diamond shaped openings. A wire rack may also be used for the fire grate 48.

FIG. 8 shows the grill 46 which is of a selected length to fit within the length of reflector 12 and sized in width to fit atop rods 20 and 22, and within tabs 51 and 55. The grill 46 in the preferred embodiment has a width substantially equal to the center distance between the holes in leg stands 24 and 26, plus the diameter of rod 22.

FIG. 9 shows relationships of cooker 10 parts as assembled. Rod 28 has been inserted into conduits 50 and 52 in one edge of reflector 14, and through hole 40 in lid end 18. Rod 20 has been inserted into conduits 50 and 52 in one edge of reflector 12, through hole 44 in lid end 18 and through hole 32 in leg stand 24. Body end 16 is inserted between reflector 12 and leg stand 24 and supported by rods 20 and 22. Rod 22 is not shown in FIG. 10. Since rod 20 is inserted through hole 44 in lid end 18, lid assembly 15 is supported in a pivotal relation about support rod 20, and may be closed as in FIG. 1, and may be lifted to an open position as shown in FIG. 2. Angle X may be selected between 60° and 90°. In the preferred embodiment, X is 85°, to provide stability to the cooker.

FIG. 10 shows an exploded end elevation of selected parts of cooker 10. Rod 20 is inserted in conduits 50 and 52 of reflector 12, then into hole 40 in a lid end at each end of reflector 14, then into holes 32 and 36 in legs stands 24 and 26, respectively. Rod 22 is inserted into conduits 54 and 56 in reflector 12, then reflector 12 is flexed as illustrated to align and insert rod 22 into holes 34 and 38, in leg stands 24 and 26, respectively. Likewise, rod 28 is inserted in conduits 52 and 54 reflector 14, then into holes hole 40 in lid end 18 and the like hole in lid end 19. Rod 30 is inserted into conduits 54 and 56 in reflector 14 then reflector 14 is flexed as illustrated to align and insert rod 30 into hole 42 in lid 18 and the like hole in lid end 19. One body end 16 is inserted between reflector 12 and leg stand 24 and is supported atop rods 20 and 22 by tabs 58 and 60. The other body end 16 is inserted between reflector 12 and leg 26 and is supported atop rods 20 and 22 by tabs 58 and 60. Lid ends 18 may be slid along rods 28 and 30 to vary the distance from lid 14 to vary flow of draft air for the fire. Body ends 16 may be slid along rods 20 and 22 to vary the distance from reflector 12 to vary flow of draft air for the fire.

In the preferred embodiment, the center distance between the first hole and the second hole in the leg stand is 10 inches; the center distance between the conduits 50 and 54 is substantially 17.6 inches, that when the body reflector is flexed for assemble, the center distance is reduced to substantially 57% of the relaxed distance. A range of dimensions for the center distance between the conduits could range from 15 to 20 inches. For the center distance of 10 inches between the holes in the leg stands, the body reflector could by 50 to 67% for this range of distances.

DESCRIPTION OF ALTERNATE EMBODIMENTS

Figure 11:
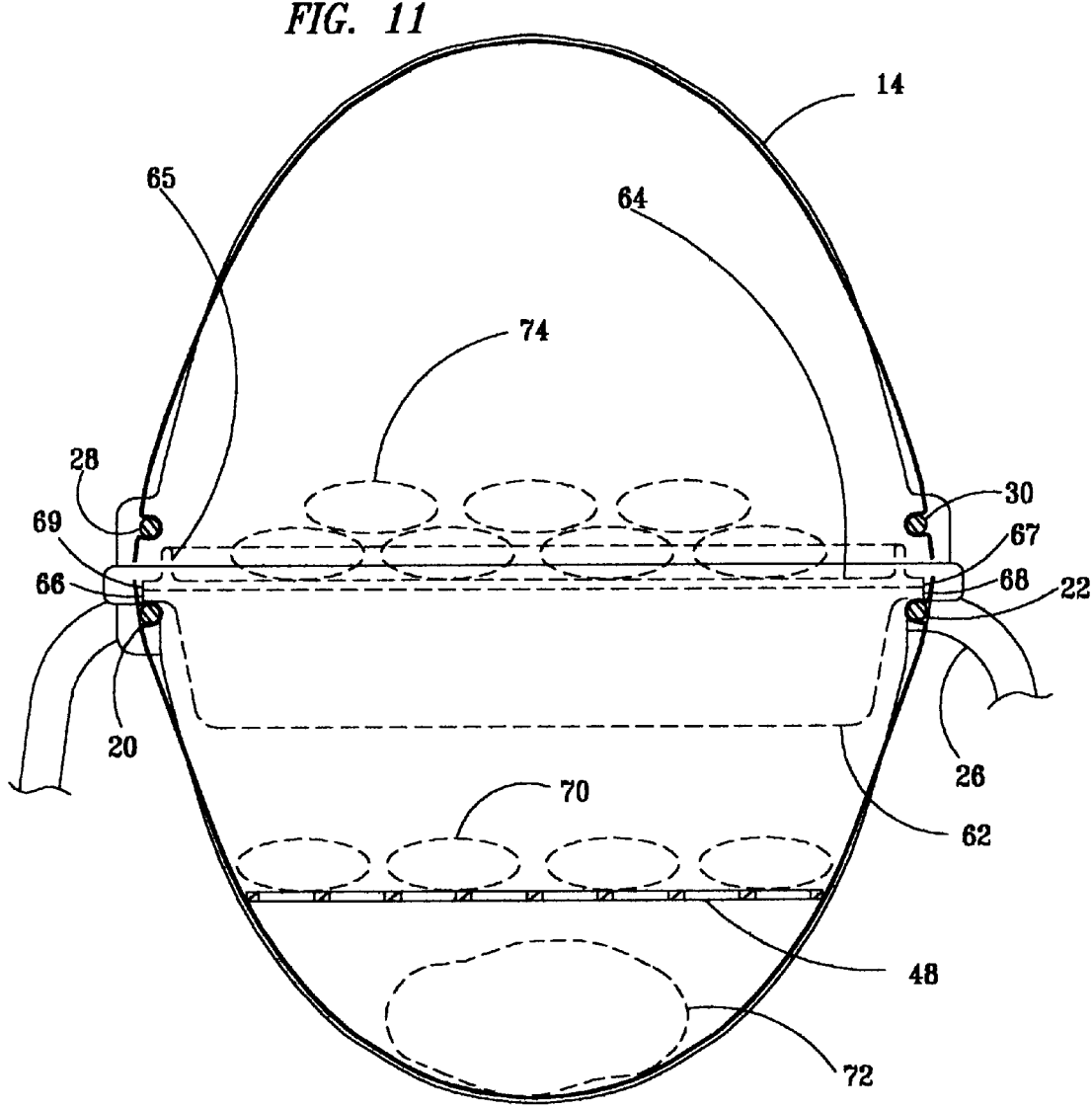
FIG. 11 is a side end view of the cooking system of FIG. 1 showing in phantom selected elements that may be positioned within the interior of the cooking system of FIG. 1.
Figure 13:
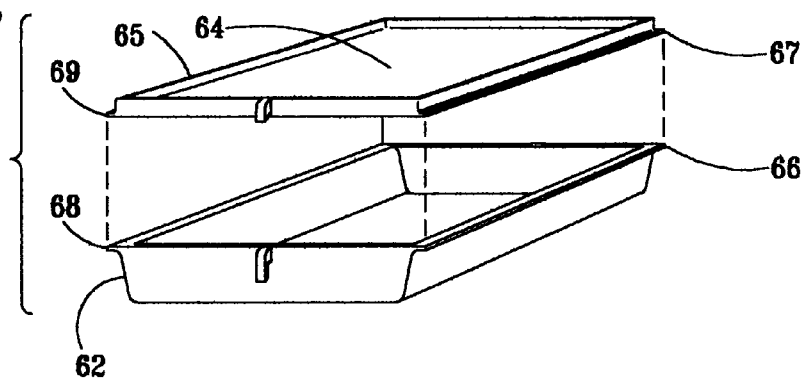
FIG. 13 is an exploded perspective view of a Dutch oven comprising a lid/griddle and pan that may be used in conjunction with the cooking system of FIG. 1.

FIG. 11 shows a cross section of the cooker in a different configuration. Referring to FIG. 13, also, pan 62 with close fitting pan lid 64 is placed with flanges 66 and 68 on pan 62 extending above and supported by rods 20 and 22. The body of pan 62 is of a width less than the center distance between the holes in leg 26, minus the diameter of rod 22. Charcoal briquets 70 are placed on grate 48 to provide heat to cook food in pan 62, as well as bake a potato 72 placed on reflector 12 below grate 48. Pan lid 64 has an upstanding rib 65 around the periphery to contain charcoal briquets 74 which may be placed atop lid 64 to aid in baking food in pan 62. The upstanding extends 0.88 inches in the preferred embodiment, although any dimension between 0.30 and 1.50 inches would be useable. Pan lid 64 has an flanges 67 and 69 which closely fit to flanges 66 and 68 on pan 62.

Figure 12:
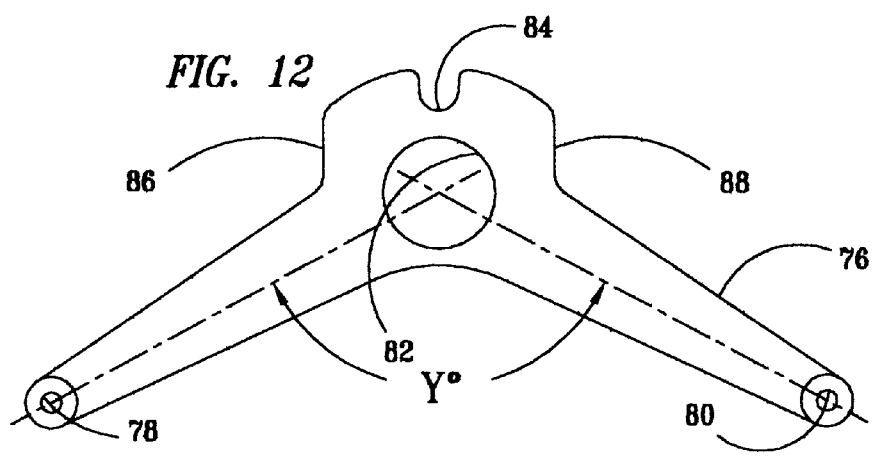
FIG. 12 is an elevation view of a support bracket configured for use with the cooking system of FIG. 1.
Figure 17:
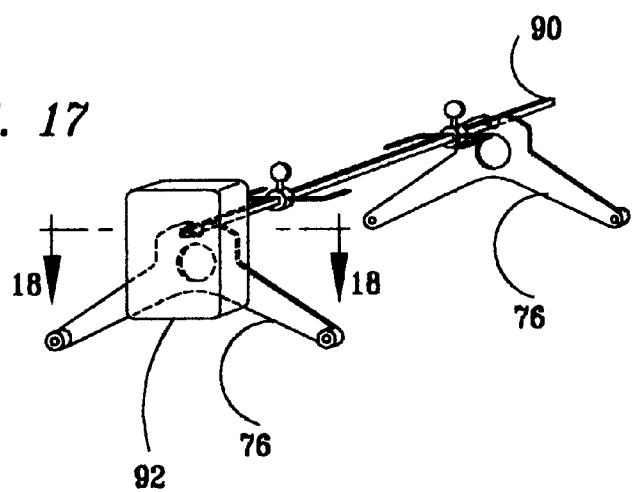
FIG. 17 is a perspective view showing how a rotisserie and spit may be mounted to brackets of FIG. 12.
Figure 18:
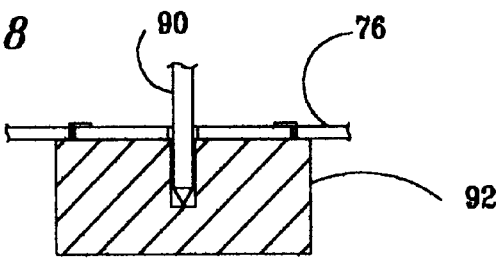
FIG. 18 is cross-sectional view of the rotisserie and spit of FIG. 17 taken along the line 18—18 of FIG. 17.

FIGS. 12 and 17 show support bracket 76 with holes 78 and 80 to fit interchangeably on the ends of rods 20 and 22. Holes 78 and 80 have the same center distance apart as holes 32 and 34 in leg stand 24 and as holes 36 and 38 in leg 26. A larger hole 82 is sized and positioned to accept and support a propane burner as will be described hereinafter. Slot 84 is positioned to accept and support a rotary spit 90 on which food may be mounted and rotated during cooking. Straight sides 86 and 88 are sized and positioned to accept and support a motor assembly 92 adapted to support and rotate the rotary spit 90. FIG. 18 illustrates the spit 90 engaged with motor assembly 92 for rotation of the spit 90 while cooking. Angle Y defines an apex angle of 90° to 170° between the axis connecting the centers of hole 78 and the hole 82 and the axis connecting centers of hole 82 and hole 78. In the preferred embodiment the angle Y is substantially 130°.

Figure 14:
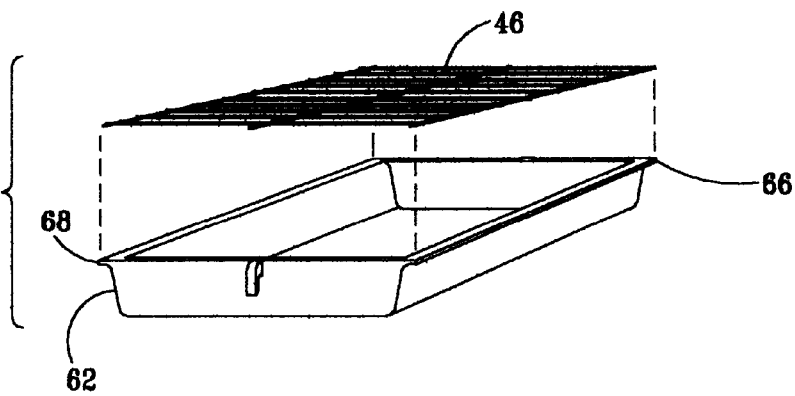
FIG. 14 is an exploded perspective view of a Dutch oven pan and grill, that may be used in conjunction with the cooking system of FIG. 1.

FIG. 14 illustrates grill 46 placed on pan 62 which is placed with flanges 66 and 68 on pan 62 extending above and to be supported by rods 20 and 22. Water may be put in the pan 62 in this configuration for steam cooking food placed on the grill 46.

Figure 15:
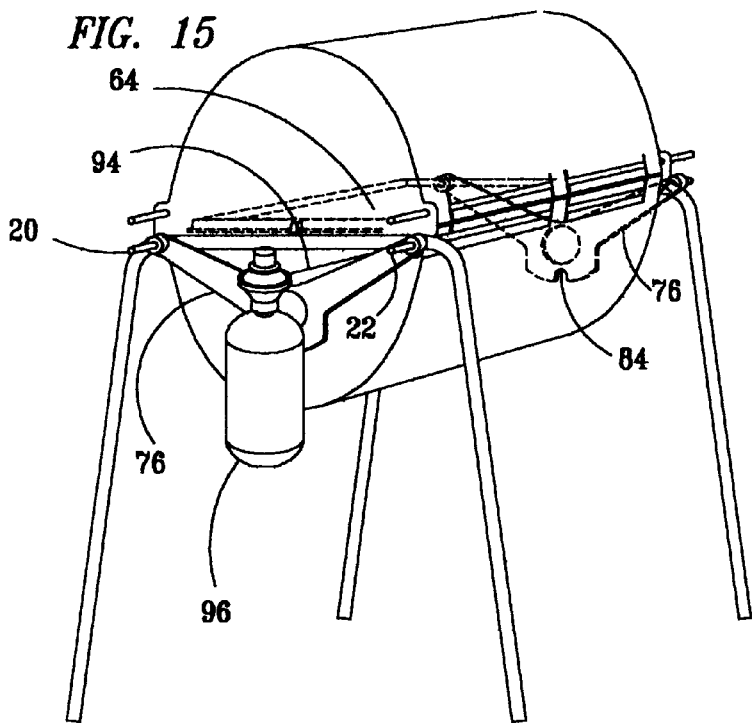
FIG. 15 is a perspective view of the system of FIG. 1 showing how two brackets of FIG. 12 may be assembled to the system to support a container of a fuel connected to a burner for cooking food on a griddle positioned in the cooking system of FIG. 1.

FIG. 15 shows the cooker 10 outfitted with an accessory propane cooking mechanism. The pair of support brackets 76 are mounted, one on each end of rods 20 and 22 with the slots 84 extending downwardly. A propane burner 94 is positioned in the apex atop support brackets 76. A propane tank 96 is connected to, and supported by the burner 94 to provide cooking heat. The body ends 16 are omitted in this configuration to allow for access for the burner 94 to extend through the cooker. The pan lid 64 is placed atop rods 20 and 22 to provide a griddle.

Figure 16:
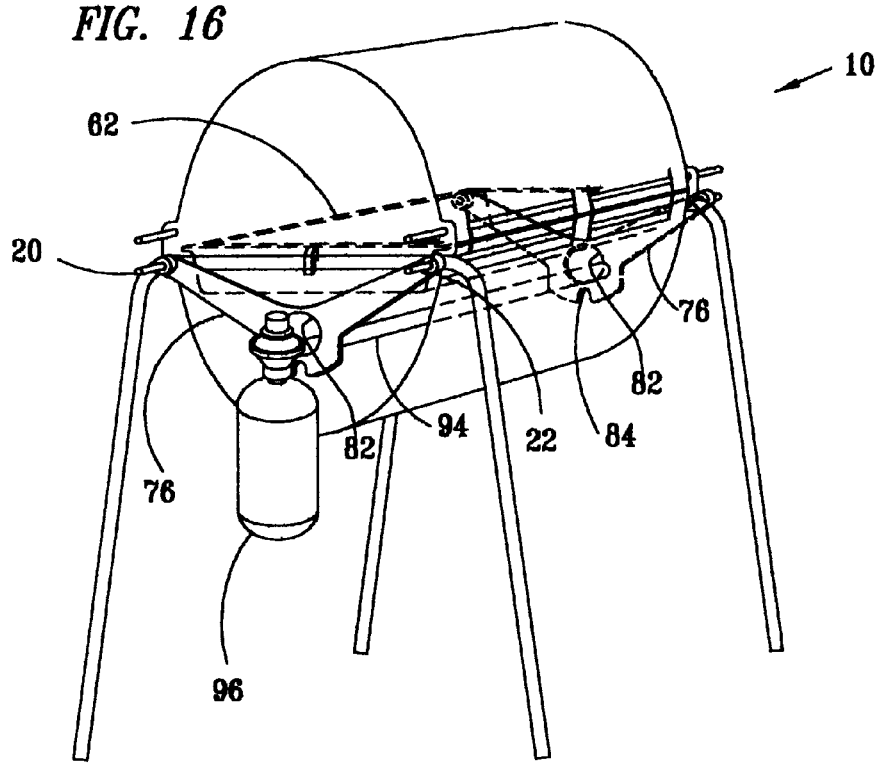
FIG. 16 is a perspective view of the system of FIG. 1 showing how two brackets of FIG. 12 may be assembled to the system to support a container of a fuel connected to a burner for cooking food in the Dutch oven lower pan of FIG. 13 positioned in the cooking system of FIG. 1.

FIG. 16 shows the cooker 10 outfitted with accessory propane cooking apparatus. A pair of support brackets 76 are mounted, one on each end of rods 20 and 22 with the slots 84 extending downwardly. A propane burner 94 is positioned in the holes 82 in support brackets 76. A propane tank 96 is connected to, and supported by the burner 94 to provide cooking heat. The pan 62 is placed atop rods 20 and 22 to deep fry, boil or steam food.

Figure 19:
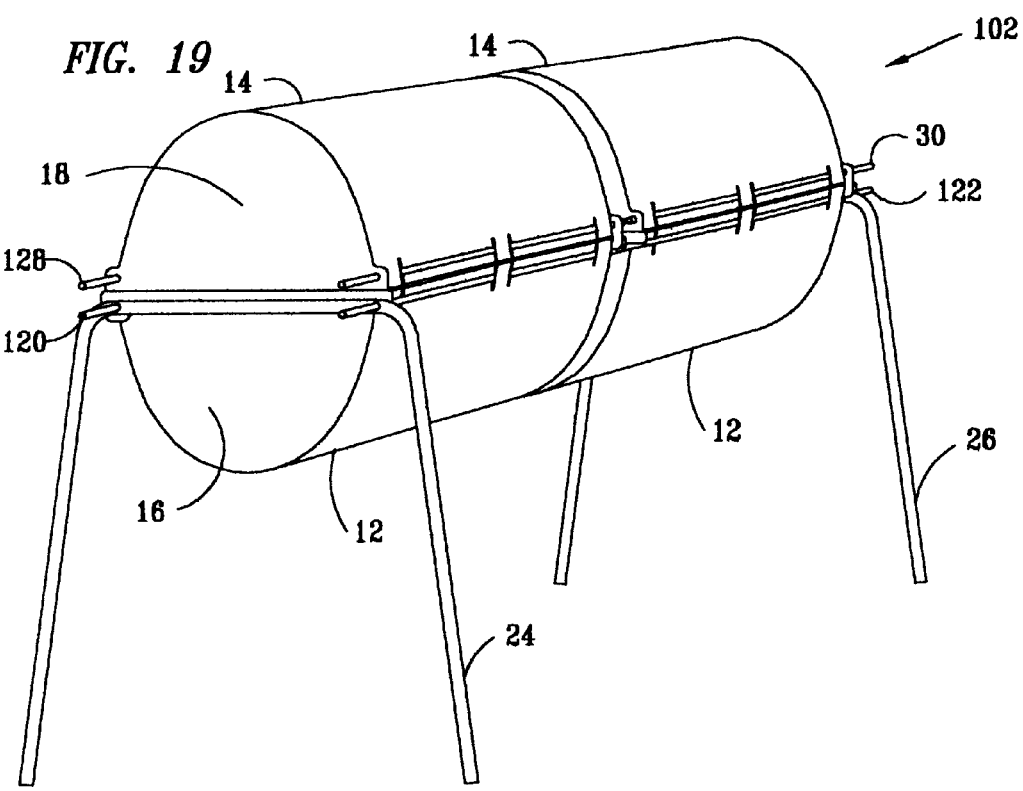
FIG. 19 is a perspective view of an alternate embodiment of the cooking system of FIG. 1 in which two cooking systems are configured to operate together.

FIG. 19 illustrates a double width cooker, generally at 102, This double width cooker is provided with support rods 120, 122 and 128 which are longer than rods 20, 22, 28 and 30, and are assembled and used in a similar manner to rods 20, 22 and 128. Two each rods 30 are assembled with two reflectors 14 and four lid ends 18. The reflectors 14 and two reflectors 12 are assembled on rods 120, 122, 128 and two rods 30. In this configuration, each lid assembly may be lifted independently to tend to the food or fire at that end of the cooker.

Figure 20:
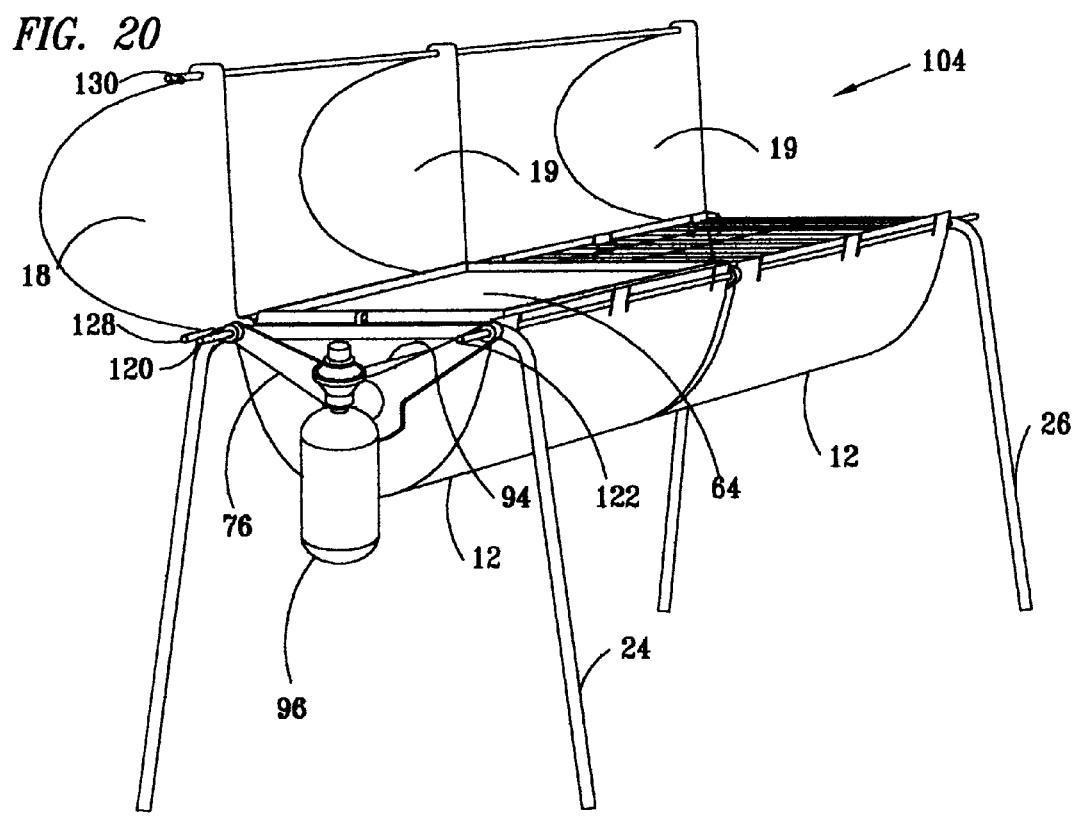
FIG. 20 is a perspective view of the cooking system of FIG. 19 wherein top reflectors are open and a container of fuel is positioned along one end thereof for cooking on a griddle on one side of the cooking system, and a charcoal grill is used on the other side.

FIG. 20 illustrates a double width cooker, generally at 104, respectively. This double width cooker is provided with support rods 120, 122, 128 and 130, which are longer than rods 20, 22, 28 and 30, and are assembled and used in a similar manner to rods 20, 22, 28 and 30. Two each reflectors 12 and 14 are assembled on rods 120, 122, 128 and 130. Two or three lid ends 19 as illustrated may be used. Brackets 76 are used to support a propane burner 94 and propane tank 96. In this embodiment, one can griddle and grill simultaneously.

Cooker 102 may be assembled with body ends 16 for use with one or two grates 48 to support fuel such as charcoal or wood.

Cooker 104 may be assembled with brackets 76, propane burner 94 and propane tank 96 and without body ends 16 to provide propane heat for cooking.

FIG. 21 illustrates a double width cooker similar to the cooker in FIG. 20, except without brackets 76, with propane burner 94 and propane tank 96 with burner 94 simply positioned in the bottom of reflector 12 to provide propane heat for quickly starting a charcoal fire, after which the propane burner 94 is removed and body end 16 installed. In this embodiment, bracket 121 and 123 engage rods 130 and 128 and 120 and 122 to maintain the shape of reflectors 12 and 14. By controlling draft with lid ends 19 and body ends 16, and by having heat source on one side and food on the other side, one can slow smoke food with indirect heat.

FIG. 22 illustrates a double width cooker assembled with support rods 120, 122, 128 and 130, similar to FIG. 19, except without reflectors 12 so that the cooker may be placed above a camp fire or other heat source on the ground. Two or three brackets 76 may be placed with the conduit slot 84 above rods 120 and 122. A long spit 190 may be assembled with a rotisserie motor assembly 92 to turn food, for example, chicken or game birds for cooking above a fire below the cooker. Lid ends 118 are similar to lid ends 18 except that slot 119 in each lid end 118 provide clearance to close the lid around the spit 190.

Figure 23:
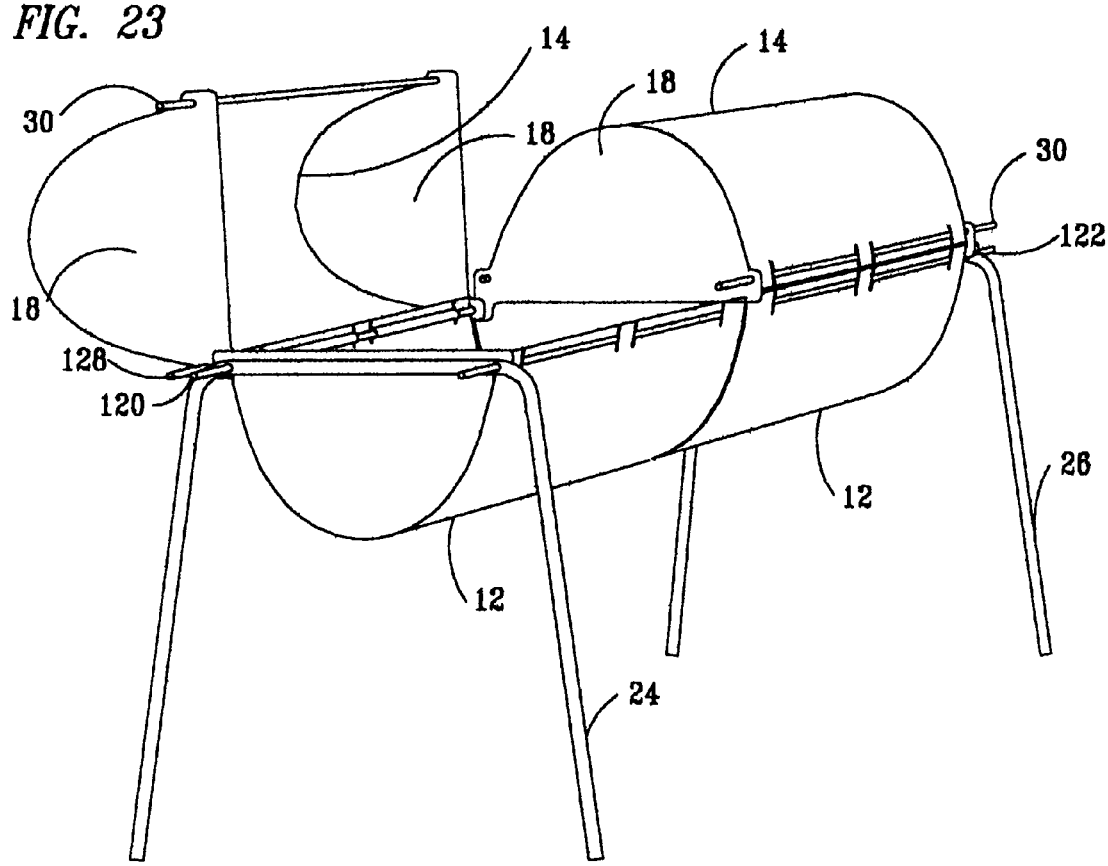
FIG. 23 is a perspective view of the cooking system of FIG. 19 showing how one top reflector may be open while the other top reflector is closed so that different cooking modes may be isolated from each other.

FIG. 23 illustrates a double width cooker with reflectors 14 assembled with support rods 120 and 122. The lids are assembled with two reflectors 14, rod 128, two support rods 30, and four lid ends 18, as illustrated. Rods 120 and 122 connect and support reflectors 12 as described hereinbefore. In this configuration, it is possible to open only one lid section at a time to reduce the loss of heat while attending to the food or fire at one end of the double width cooker.

Figure 24:
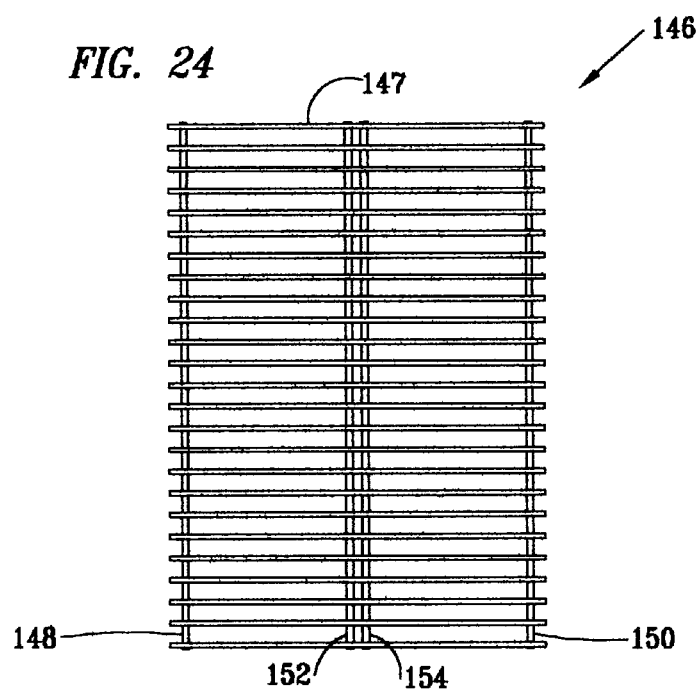
FIG. 24 is a plan view of an alternate embodiment grill.
Figure 25:
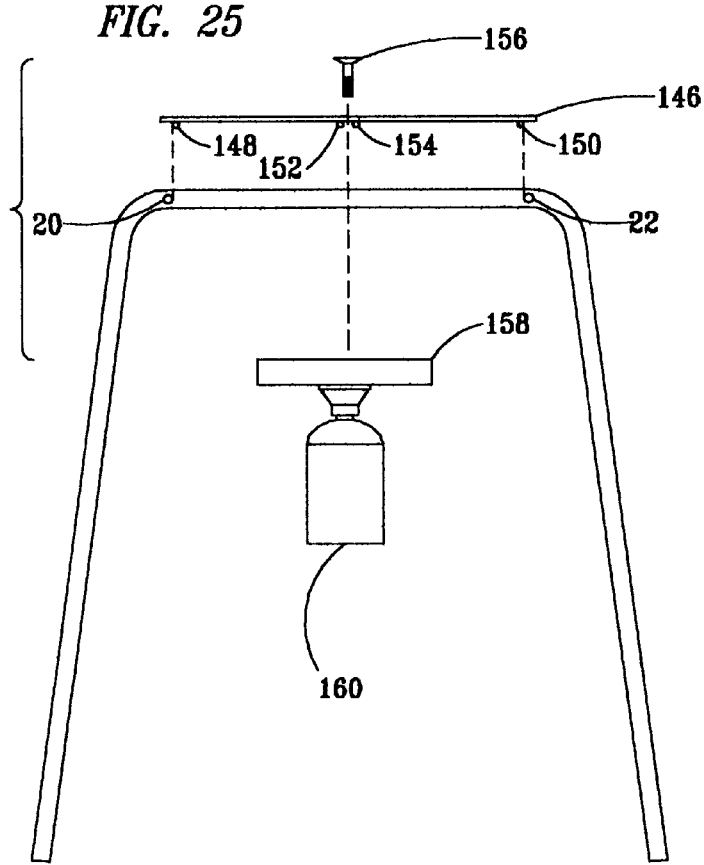
FIG. 25 is an exploded elevation view of the alternate embodiment grill of FIG. 24 adapted for use over an open camp fire, and also including an accessory propane burner assembly including legs and support rods.

FIGS. 24 and 25 illustrate an alternate embodiment grill. In this embodiment, grill 146 is illustrated as a welded wire assembly, with a multiplicity of cross members 147 positioned closely enough together in a first plane to support food to be cooked without allowing the food to fall through the grill. In a second plane, longitudinal rods 148, 150, 152 and 154 are welded to the cross members 147. In the preferred embodiment, rods 148, 150 152 and 154 are the same diameter. Rods 148 and 150 fit parallel to and between rods 20 and 22, to hold grill 146 in place, even when used without reflector 12. Rods 152 and 154 are spaced apart substantially 0.3 inches apart to allow a ¼" bolt 156 to pass through and engage the head of bolt 156. Bolt 156 screws into propane burner 158 to support one or more burners 158 from grill 146. Cross members 147 are spaced apart far enough to allow the head of bolt 156 to fit between cross members 147. By allowing the head of bolt 156 to fit down between cross members 147, the bolt head is below the top of grill 147, where the bolt head will not interfere with a pot or pan placed on grill 147. This provides means for suspending a propane burner from the grill. These means may also include a washer attached to the grill. Top of grill 147 is level with top of legs stand 24. By sliding leg stands 24 outward on rods 20 and 22, legs 24 serve as additional support for large pots and pans.

FIG. 25 illustrates an exploded elevation view of the alternate embodiment grill of FIG. 24 including an accessory propane burner 158 with propane tank 160. In this alternate embodiment, for example, over an open camp fire, one could cook with accessory propane burner 158 with propane tank 160. Support rods 20 and 22 are assembled into holes 32 and 34 in two legs 24 as described hereinbefore. Longitudinal rods 148 or 150 are positioned at a center distance at a center distance between holes 32 and 34 in leg 24 less the diameter of rod 20, less the diameter of rod 148.

The grill according to this invention may be assembled without the body reflector 14 and placed above a campfire to perform cooking. For the purpose of this specification, a campfire includes any fire built on a non-combustible surface, whether indoors or outdoors, other than on a grate supported in a body reflector 14 of this invention.

The grill according to this invention may have at least one of the body front rod or body back rod of sufficient length to hang one or more cooking utensils, or to act as handles to lift the cooker. In the preferred embodiment, the grill according to this invention has the lid front rod of sufficient length to extend substantially 1 inch beyond each lid end to act as handles to lift the lid. In any embodiment of this invention, both of the body front rod and body back rod may have a first and a second end and are of sufficient length to extend beyond each of the leg stands to provide a handles for moving the grill. I have disclosed a portable grill wherein the lid ends, each having the lid front hole, each lid end having the lid back hole, each lid end having a hinge hole through which the body back rod is insertably located, providing rotatable attachment of the lid ends and lid reflector about the body back rod when rotated about the body back rod, brings the lid back rod into engagement with the leg stands, thereby limiting rotation of the lid ends and thereby the lid assembly to 60° to 120° about the body back rod. In the preferred embodiment, rotation of the lid ends is substantially 90° about the body back rod although 75 to 105 could be a useful range. Another feature of this invention is that both of the body front rod and body back rod have first and second ends and are of sufficient length to extend beyond each of the leg stands to provide a handles for moving the grill.

For purposes of this specification, flammable fuel is defined as wood or charcoal, or other flammable material that can be used as fuel for cooking.

Even though several embodiments of the invention have been illustrated in the accompanying drawings and described in the foregoing Description it will be understood that the invention is not limited to the embodiments disclosed, but is capable of rearrangements, modifications, and substitutions and reversals of parts and elements without departing from the spirit of the invention.

I claim:

1. A portable cooker comprising:

at least two leg stands, each leg stand having a center portion, each leg stand having a leg portion extending from each end of the center portion forming a pair of legs unitary with the center portion, each leg terminating in a leg end, each leg stand having a first hole near one end of the center portion, each leg stand having a second hole near the opposite end of the center portion, the hole positions defining a center distance between the holes and between the body front rod and the body back rod;

a body front rod, insertably positioned through the first hole in each of the leg stands;

a body back rod, insertably positioned through the second hole in each of the leg stands;

a pair of generally semi-circular, flat body ends, each body end having a body end tab at each diametrical end, each body end hanging downwardly being suspended by a first body end tab resting on top of the body front rod and by a second body end tab resting on top of the body back rod;

a generally rectangular flexible body reflector, the body reflector having a body front edge and an opposite body back edge, the body front edge having at least one integrally formed conduit, having a central axis the body back edge having at least one integrally formed conduit having a central axis the body reflector being located between the body ends, the body reflector held in a generally downwardly generally semi-cylindrically flexed position by the conduit on the body front edge engaging the body front rod and by the conduit on the body back edge engaging the body back rod, the conduits each having a central axis therethrough;

a pair of generally semi-circular, flat lid ends, each lid end having a lid front hole, each lid end having a lid back hole, each lid end having a hinge hole through which the body back rod is insertably located, a lid front rod, insertably positioned through the lid front hole in each of the lid ends;

a lid back rod, insertably positioned through the lid back hole in each of the lid ends; and a generally rectangular flexible lid reflector, the lid reflector having a lid front edge and an opposite lid back edge, the lid front edge having at least one integrally formed conduit the lid back edge having at least one integrally formed conduit, the lid reflector being located between the lid ends, the lid reflector held in a generally upwardly generally semi-cylindrically flexed position by location of the lid front rod through and supporting the conduit on the lid front edge, and by location of the lid back rod through and supporting the conduit on the lid back edge, providing rotatable attachment of the lid ends and lid reflector about the body back rod the conduit on the front edge having a central axis, the conduit on the back edge having a central axis.

2. A portable cooker as described in claim 1, wherein the lid reflector, the body reflector, body front rod, body back rod, lid front rod, lid back rod, lid ends, body ends, and leg stands, when disassembled, are of generally planar configuration, and may be arranged in a stack suitable for storage in a generally flat carrying container.

3. The portable cooker according to claim 1 further comprising:
a generally rectangular grate for supporting flammable fuel in the cooker, the grate having a width less than the center distance between the body front rod and the body back rod, the grate having a first edge and a second opposite edge, the edges located inside of and engaging the interior of the body reflector to support the grate beneath the grill.

4. The portable cooker according to claim 3 wherein at least one of the body ends may be lifted out to access the grate to add flammable fuel.

5. The portable cooker according to claim 3 wherein at least one of the body ends may be lifted out to access the grate to remove ashes from flammable fuel.

6. The portable cooker according to claim 3 wherein the grate may be positioned in a generally horizontal position.

7. The portable cooker according to claim 3 wherein the grate may be positioned in a generally angular position to place one edge of the grate closer to the grill.

8. The portable cooker according to claim 3 wherein the grate edges are located inside of and engaging the interior of the body reflector to support the grate above the bottom of the body reflector to provide a cooking space below the grate.

9. The portable cooker according to claim 8 wherein a width between the grate edges is 60 to 80 percent of the distance between the first hole and the second hole in the leg stand.

10. The portable cooker according to claim 8 wherein a width between the grate edges 65 to 75 percent of the distance between the first hole and the second hole in the leg stand.

11. The portable cooker according to claim 8 wherein a width between the grate edges is substantially 70 percent of the distance between the first hole and the second hole in the leg stand.

12. The portable cooker according to claim 1 further comprising:
a rectangular pan, located inside of the body reflector, the pan supported atop the front body rod and the back body rod.

13. The portable cooker according to claim 12 further comprising:
a pan lid for the rectangular pan, the pan lid having a lid center portion adapted to cover the pan, and an upstanding rib around the periphery of the pan lid.

14. The portable cooker according to claim 13 wherein the upstanding rib around the periphery of the pan lid extends between 0.30 and 1.50 inches above the lid center portion.

15. The portable cooker according to claim 14 wherein the upstanding rib around the periphery of the pan lid extends substantially 0.88 inches above the lid center portion.

16. The portable cooker according to claim 1 further comprising:
a pan lid, positioned in a generally horizontal position, supported atop the front body rod and the back body rod, an upstanding rib around the periphery of the pan lid, the pan lid thereby adapted to act as a griddle.

17. The portable cooker according to claim 1 wherein the body reflector and lid reflector are substantially identical and interchangeable.

18. The portable cooker according to claim 1 wherein the body front rod, body back rod, lid front rod, and lid back rod, are substantially identical and interchangeable.

19. The portable cooker according to claim 1 further comprising:
a pair of brackets, each bracket having a first mounting hole for positioning on the body front rod, each bracket having a second mounting hole for positioning on the body back rod, the brackets located on opposite sides of the body reflector, each bracket having a support hole.

20. The portable cooker according to claim 19 further comprising:
a propane burner insertable and supportable in the support holes of the brackets.

21. The portable cooker according to claim 19 wherein at least one of the brackets is adapted to receive and support a rotisserie motor.

22. The portable cooker according to claim 21 further comprising:
a rotisserie motor.

23. The portable cooker according to claim 22 further comprising:
a spit.

24. The portable cooker according to claim 23 wherein the other of at least one of the brackets is adapted to receive and support a first end of the spit while a second end of the spit is supported in the rotisserie motor.

25. The portable cooker according to claim 19 wherein the brackets, each have the support hole positioned so that an axis connecting the support hole and the first mounting hole and an axis connecting the support hole and the second mounting hole define an apex angle of 90° to 170° between the axes.

26. The portable cooker according to claim 25 wherein the apex angle is substantially 130°.

27. The portable cooker according to claim 1 wherein at least one of the body ends may be spaced apart from the body reflector to provide combustion air for the grill.

28. The portable cooker according to claim 1 wherein at least one of the lid ends may be spaced apart from the lid reflector to provide combustion air for the cooker.

29. The portable cooker according to claim 1 wherein at least one of the body front rod or body back rod has a first and a second end and is of sufficient length to extend beyond one of the leg stands to hang a cooking utensil on at least on one of the first or second ends of the body rod.

30. The portable cooker according to claim 1 wherein the lid front rod is if sufficient length to extend substantially 1 inch beyond each lid reflector.

31. The portable cooker according to claim 1 wherein the body reflector has a tab extending upwardly above the conduit at the body front edge, and the body reflector has a tab extending upwardly above the conduit at the body back edge, whereby the tabs position the grill between the tabs and atop the body back rod and the body front rod.

32. The portable cooker according to claim 1 wherein both of the body front rod and body back rod have a first and a second end and are of sufficient length to extend beyond each of the leg stands to provide handles for moving the cooker.

33. The portable cooker according to claim 1 wherein the lid ends, provide rotatable attachment of the lid ends and lid reflector about the body back rod when rotated about the body back rod, brings the lid back rod into engagement with the leg stands, thereby limiting rotation of the lid ends to 60° to 120° about the body back rod.

34. The portable cooker according to claim 1 wherein the body reflector is flexible to allow all four leg ends to rest on an irregular surface in which one leg end may flex to a position at least 2 inches from a plane defined by the other three leg ends.

35. The portable cooker according to claim 1 wherein the lid ends, provide rotatable attachment of the lid ends and lid reflector about the body back rod when rotated about the body back rod, brings the lid back rod into engagement with the leg stands, thereby limiting rotation of the lid ends to substantially 90° about the body back rod.

36. The portable cooker according to claim 1 wherein the lid ends, having the lid front hole, each lid end having the lid back hole, each lid end having a hinge hole through which the body back rod is insertably located, providing rotatable attachment of the lid ends and lid reflector about the body back rod when rotated about the body back rod, brings the lid back rod into engagement with the leg stands, thereby limiting rotation of the lid ends to 75° to 105° about the body back rod.

37. The portable cooker according to claim 1 wherein the center distance between the first hole and the second hole in the leg stands is 50 to 67 percent of the distance between the central axis of the conduit on the body front edge and the central axis of the conduit on the body back edge.

38. The portable cooker according to claim 1 wherein the center distance between the first hole and the second hole in the leg stands is substantially 57 percent of the distance between the central axis of the conduit on the body front edge and the central axis of the conduit on the body back edge.

39. The portable cooker according to claim 1 wherein the cooker has means for suspending a propane burner from the grill.

40. The portable cooker according to claim 39 wherein the means for suspending a propane burner from the grill comprises a pair of rods fixed to the grill.

41. The portable cooker according to claim 40 wherein the pair of rods fixed to the grill are spaced substantially 0.3 inches apart.

42. A portable cooker as described in claim 1 further comprising:
   a generally rectangular grill located inside of the body reflector, the grill supported atop the front body rod and the back body rod.

43. The portable cooker according to claim 42 further comprising:
   a propane burner, and;
   bracket means for attaching the propane burner to the grill.

44. A portable cooker comprising:
   at least two leg stands, each leg stand having a center portion, each leg stand having a leg portion extending from each end of the center portion forming a pair of legs unitary with the center portion, each leg stand having a first hole near one end of the center portion, each leg stand having a second hole near the opposite end of the center portion;
   a body front rod, insertably positioned through the first hole in each of the leg stands;
   a body back rod, insertably positioned through the second hole in each of the leg stands;
   a pair of generally semi-circular, flat body ends, each body end having a body end tab at each diametrical end, each body end hanging downwardly being suspended by a first body end tab resting on top of the body front rod and by a second body end tab resting on top of the body back rod;
   at least two generally rectangular flexible body reflectors, each of the body reflectors having a body front edge and an opposite body back edge, each of the body front edges having at least one integrally formed conduit each of the body back edges having at least one integrally formed conduit, each of the body reflectors being located between the body ends, the body reflectors held in a generally downwardly generally semi-cylindrically flexed position by the conduit on the body front edge engaging the body front rod and by the conduit on the body back edge engaging the body back rod;
   a pair of generally semicircular, flat lid ends, each lid end having a lid front hole, each lid end having a lid back hole, each lid end having a hinge hole through which the body back rod is insertably located, providing rotatable attachment of the lid ends about the body back rod;
   a lid front rod, insertably positioned through the lid front hole in each of the lid ends;
   a lid back rod, insertably positioned through the lid back hole in each of the lid ends;
   at least two generally rectangular flexible lid reflectors, the lid reflectors having a lid front edge and an opposite lid back edge, each of the lid front edges having at least one integrally formed conduit each of the lid back edges having at least one integrally formed conduit, on each of the lid reflectors being located between and adjacent to the lid ends, each of the lid reflectors held in a generally upwardly generally semi-cylindrically flexed position by location of the lid front rod through and supporting the conduit on each of the lid front edges, and by location of the lid back rod through and supporting the conduit on the lid back edge,
   a generally rectangular grill located inside of the body reflector, the grill supported by the interior of at least one of the body reflectors, atop the front body rod and the back body rod, the grill resting in a generally horizontal position.

45. The portable cooker according to claim 44 further comprising:
   a generally rectangular grate for supporting flammable fuel in the cooker, the grate having a width less than the width of the grill, the grate having a first edge and a second opposite edge, the edges located inside of at least one of the body reflectors, the grate edges supported by the interior of one of the body reflectors.

46. The portable cooker according to claim 45 wherein the grate is positioned substantially within one of the body reflectors, and the grill is positioned in the other of the body reflectors, whereby cooking may be accomplished with indirect heat.

47. The portable cooker according to claim 44 further comprising:
   a third leg stand, wherein the body reflectors are positioned between two of the leg stands and the third leg stand is positioned between the body reflectors.

48. A portable cooker for use above a campfire comprising:
   at least two leg stands, each leg stand having a center portion, each leg stand having a leg portion extending from each end of the center portion forming a pair of legs unitary with the center portion, each leg stand having a first hole near one end of the center portion, each leg stand having a second hole near the opposite end of the center portion;
   a body front rod, insertably positioned through the first hole in each of the leg stands;
   a body back rod, insertably positioned through the second hole in each of the leg stands;

a pair of generally semi-circular, flat lid ends, each lid end having a lid front hole, each lid end having a lid back hole, each lid end having a hinge hole through which the body back rod is insertably located, providing rotatable attachment;

a lid front rod, insertably positioned through the lid front hole in each of the lid ends;

a lid back rod, insertably positioned through the lid back hole in each of the lid ends;

a generally rectangular flexible lid reflector, the lid reflector having a lid front edge and an opposite lid back edge, the lid front edge having at least one integrally formed conduit, the lid back edge having at least one integrally formed conduit the lid reflector being located between [and adjacent to] the lid ends, the lid reflector held in a generally upwardly generally semi-cylindrically flexed position by location of the lid front rod through and supporting the conduit on the lid front edge, and by location of the lid back rod through and supporting the conduit on the lid back edge, and a generally rectangular grill located between the front body rod and the back body rod, the grill supported atop the front body rod and the back body rod.

49. A method of assembling a portable cooker from generally planar parts comprising the steps of:

inserting a body back rod through a first conduit in an edge of a body reflector, inserting one end of the body back rod through a hole in a first leg stand, inserting the other end of the body back rod through a hole in a second leg stand, inserting a body front rod through a second conduit in an edge of the body reflector opposite the first conduit, flexing the body reflector to align the body front rod with another hole in the first leg stand, inserting an end of the body front rod through another hole in the first leg stand, inserting the other end of the body front rod through another hole in the second leg stand, and placing a grill atop the body front rod and the body back rod.

50. The method of assembling a portable cooker according to claim 49, further comprising the step of placing a grate inside the body reflector, under the grill.

51. The method of assembling a portable cooker according to claim 49, further comprising the steps of:

inserting a body end between the first leg stand and the body reflector, and inserting another body end between the second leg stand and the body reflector.

52. A method of assembling a portable cooker for use over a camp fire from generally planar parts comprising the steps of:

inserting a back lid rod through a first conduit in an edge of a lid reflector, inserting one end of the back lid rod through a back lid hole in a first lid end, inserting the other end of the back lid rod through a back lid hole in a second lid end, inserting a front lid rod through a second conduit in an edge of the lid reflector opposite the first conduit, flexing the lid reflector to align the front lid rod with a front lid hole in the first lid end, inserting the one end of the lid front rod through the front lid hole in the first lid end, inserting the other end of the front lid rod through a front lid hole in the second lid end, inserting one end of a body back rod through a hinge hole in the first lid end and through a hole in a first leg stand, inserting the other end of the back rod through a hinge hole in the second lid end, and through a hole in a second leg stand, inserting one end of a body front rod through another hole in the first leg stand, inserting the other end of the body front rod through another hole in the second leg stand, and placing a grill atop the body front rod and the body back rod.

53. A method of assembling a portable cooker from generally planar parts comprising the steps of:

inserting a body back rod through a first conduit in an edge of a body reflector, inserting one end of the body back rod through a hinge hole in a first lid end and through a hole in a first leg stand, inserting the other end of the body back rod through a hinge hole in a second lid end, and through a hole in a second leg stand, inserting a body front rod through a second conduit in an edge of the body reflector opposite the first conduit, flexing the body reflector to align the body front rod with another hole in the first leg stand, inserting an end of the body front rod through the another hole in the first leg stand, inserting the other end of the body front rod through another hole in the second leg stand, inserting a back lid rod through a first conduit in an edge of a lid reflector, inserting one end of the back lid rod through the back lid hole in the first lid end, inserting the other end of the back lid rod through a back lid hole in the second lid end, inserting a front lid rod through a second conduit in an edge of the lid reflector opposite the first conduit, flexing the body reflector to align the front lid rod with the front lid hole in the first lid end, inserting an end of the front rod through a front lid hole in the first lid end, inserting the other end of the front rod through a front hole in the second lid end, and placing a grill atop the body front rod and the body back rod.

54. The method of assembling a portable cooker according to claim 53, further comprising the step of placing a grate inside the body reflector, under the grill.

55. The method of assembling a portable cooker according to claim 53, further comprising the steps of:

inserting a body end between the first leg stand and the body reflector, and inserting another body end between the second leg stand and the body reflector.

56. A portable cooker comprising:

at least two leg stands, each leg stand having a center portion, each leg stand having a leg portion extending from each end of the center portion forming a pair of legs unitary with the center portion, each leg terminating in a leg end, each leg stand having a first hole near one end of the center portion, each leg stand having a second hole near the opposite end of the center portion, the hole positions defining a center distance between the holes;

a body front rod, insertably positioned through the first hole in each of the leg stands;

a body back rod, insertably positioned through the second hole in each of the leg stands;

means on an underside of the cooker for receiving heat;

a pair of generally semicircular, flat lid ends, each lid end having a lid front hole, each lid end having a lid back hole, each lid end having a hinge hole through which the body back rod is insertably located, a lid front rod, insertably positioned through the lid front hole in each of the lid ends;

a lid back rod, insertably positioned through the lid back hole in each of the lid ends;

at least one generally rectangular flexible lid reflector, the lid reflector having a lid front edge and an opposite lid back edge, the lid front edge having at least one integrally formed conduit the lid back edge having at least one integrally formed conduit, the lid reflector being located between the lid ends, the lid reflector held in a generally upwardly generally semi-cylindrically flexed position by location of the Lid front rod through and supporting the conduit on the lid front edge, and by location of the lid back rod through and supporting the conduit on the lid back edge, providing rotatable attachment of the lid ends and lid reflector about the body back rod the conduit on the front edge having a central axis, the conduit on the back edge having a central axis;

wherein the body front rod and the body back rod, are of sufficient length to extend through and beyond the leg stands;

wherein the lid front rod and the lid back rod are of sufficient length to extend through and beyond the lid ends; and wherein the hole positions in the leg stands define the distance between the body front rod and the body back rod.

57. The cooker according to claim 56 wherein the means for receiving heat comprises:

a generally rectangular flexible body reflector, the body reflector having a body front edge and an opposite body back edge, the body front edge having at least one integrally formed conduit, having a central axis the body back edge having at least one integrally formed conduit having a central axis the body reflector being located between the body ends, the body reflector held in a generally downwardly generally semi-cylindrically flexed position by the conduit on the body front edge engaging the body front rod and by the conduit on the body back edge engaging the body back rod, the conduits each having a central axis therethrough;

at least one generally semi-circular, flat body end, the body end having a body end tab at each diametrical end, the body end hanging downwardly being suspended by a first body end tab resting on top of the body front rod and by a second body end tab resting on top of the body back rod; and a generally rectangular gate for supporting flammable fuel in the cooker, the grate having a width less than the center distance been the body front rod and the body back rod, the grate having a fist edge and a second opposite edge, the edges located inside of and engaging the interior of the body reflector to support the grate beneath the body rods.

58. The cooker according to claim 56 comprising:

a propane burner;

wherein the means for receiving heat comprises:

a generally rectangular flexible body reflector, the body reflector having a body front edge and an opposite body back edge, the body front edge having at least one integrally formed conduit, having a central axis the body back edge having at least one integrally formed conduit having a central axis the body reflector being located between the body ends, the body reflector held in a generally downwardly generally semi-cylindrically flexed position by the conduit on the body front edge engaging the body front rod and by the conduit on the body back edge engaging the body back rod, the conduits each having a central axis therethrough;

a generally semi-circular, flat body end, the body end having a body end tab at each diametrical end, the body end hanging downwardly being suspended by a first body end tab resting on top of the body front rod and by a second body end tab resting on top of the body back rod;

a pair of brackets, each bracket having a first mounting hole for positioning on the body front rod, each bracket having a second mounting hole for positioning on the body back rod, the brackets located on opposite sides of the body reflector, each bracket having a support hole; and wherein said propane burner is insertable and supportable in the support holes of the brackets.

59. The cooker according to claim 58 further comprising:

a griddle positioned in a generally horizontal position, supported atop the front body rod and the back body rod, an upstanding rib around the periphery of the griddle.

60. The cooker according to claim 58 further comprising:

a pan positioned in a generally horizontal position, supported atop the front body rod and the back body rod.

61. The cooker according to claim 56 comprising:

two of the lid reflectors; and wherein the means for receiving heat comprises:

a pair of rectangular flexible body reflectors, the body reflectors each having a body front edge and an opposite body back edge, each body front edge having at least one integrally formed conduit, having a central axis the body back edge having at least one integrally formed conduit having a central axis the body reflector being located between the body ends, each body reflector held in a generally downwardly generally semi-cylindrically flexed position by the conduit on the body front edge engaging the body front rod and by the conduit on the body back edge engaging the body back rod, the conduits each having a central axis therethrough; and a pair of generally semi-circular, flat body ends, each body end having a body end tab at each diametrical end, each body end hanging downwardly being suspended by a first body end tab resting on top of the body front rod and by a second body end tab resting on top of the body back rod;

a generally rectangular grate for supporting flammable fuel in the cooker, the grate having a width less than the center distance between the body front rod and the body back rod, the grate having a first edge and a second opposite edge, the edges located inside of and engaging the interior of at least one of the body reflectors to support the grate beneath the body rods.

62. The cooker according to claim 56 comprising:

two of the lid reflectors;

a pair of rectangular flexible body reflectors, the body reflectors each having a body front edge and an opposite body back edge, each body front edge having at least one integrally formed conduit, having a central axis the body back edge having at least one integrally formed conduit having a central axis the body reflector being located between the body ends, each body reflector held in a generally downwardly generally semi-cylindrically flexed position by the conduit on the body front edge engaging the body front rod and by the conduit on the body back edge engaging the body back rod, the conduits each having a central axis therethrough; and wherein the means for receiving heat comprises:

a propane burner;

a pair of brackets, each bracket having a first mounting hole for positioning on the body front rod, each bracket having a second mounting hole for positioning on the body back rod, the brackets located on opposite sides of the body reflector, each bracket having a support hole;

and wherein the a propane burner is insertable and supportable in the support holes of the brackets.

63. The cooker according to claim 56 comprising:

two of the reflectors;

wherein the means for receiving heat comprises;

a pair of rectangular flexible body reflectors, the body reflectors each having a body front edge and an opposite body back edge, each body front edge having at least one integrally formed conduit, having a central axis the body back edge having at least one integrally formed conduit having a central axis the body reflector being located between the body ends, each body reflector held in a generally downwardly generally semi-cylindrically flexed position by the conduit on the body front edge engaging the body front rod and by the conduit on the body back edge engaging the body back rod, the conduits each having a central axis therethrough; and a propane burner;

wherein the propane burner is insertable and supportable inside at least one of the body reflectors.

64. The cooker according to claim 56 comprising:

at least two of the lid reflectors;

at least two of the lid ends;

a first and a second bracket, each bracket having a first mounting hole for positioning on the body front rod, each bracket having a second mounting hole for positioning on the body back rod, each bracket having a support hole, and wherein at least the first bracket is adapted to receive and support a rotisserie motor.

65. The portable cooker according to claim 64, further comprising:

a rotisserie motor.

66. The portable cooker according to claim 65 further comprising:

a spit, having first and second ends;

wherein at least the first bracket is adapted to receive and support the first end of the spit while the second end of the spit is supported in the rotisserie motor; and wherein at least one of the lid ends has clearance to fit around the spit when the lid reflectors are in the closed position.

* * * * *